United States Patent [19]

Livesey et al.

[11] 4,434,054
[45] Feb. 28, 1984

[54] FILTER FOR SEPARATING DISCRETE SOLID ELEMENTS FROM A FLUID STREAM

[75] Inventors: Declan B. Livesey, Calgary; Petre Toma, Edmonton, both of Canada

[73] Assignee: Texaco Canada Resources Ltd., Calgary, Canada

[21] Appl. No.: 451,709

[22] Filed: Dec. 20, 1982

[51] Int. Cl.³ .................. B01D 39/06; B01D 39/20
[52] U.S. Cl. ........................... 210/484; 210/497.01; 210/509
[58] Field of Search ........... 210/747, 170, 484, 497.01, 210/500.1, 509

[56] References Cited
U.S. PATENT DOCUMENTS 2,391,609 12/1945 Wright .......................... 210/497.01
2,837,032 6/1958 Horsting ....................... 210/497.01
3,252,270 5/1966 Pall et al. .......................... 210/502

Primary Examiner—Ivars C. Cintins
Attorney, Agent, or Firm—Carl G. Ries; Robert A. Kulason; Robert B. Burns

[57] ABSTRACT

A filter element which is physically capable of withstanding adverse operating conditions in a subterranean environment. The filter element comprises a durable, yet fluid pervious casing through which a particulate carrying fluid is radially passed after leaving the substrate. An annular bed within the casing, is formed of a metallic fibrous mass which defines multitudinous flow passages that retain the solid particles, yet pass the residual fluid therethrough. A fluid pervious sheath surrounds the metallic mass to form an initial particle retention phase, to maintain the fibrous mass in its desired shape, and to function as a base for accumulating retained solids.

8 Claims, 5 Drawing Figures

FILTER FOR SEPARATING DISCRETE SOLID ELEMENTS FROM A FLUID STREAM

BACKGROUND OF THE INVENTION

In any fluid that is removed through a well or other means from a subterranean reservoir, there will be a certain amount of solid materials carried along in the fluid flow. In the instance of a well which terminates at its lower end in a liquid pool such as water, the amount of solid material will be limited.

In the instance, however, of a hydrocarbon producing well, the latter doesn't usually terminate in a pool but rather in a hydrocarbon bearing substrate. The substrate normally comprises a subterranean formation which will include an agglomerate of materials such as sands, clays, etc.

The in situ pressures in a subterranean reservoir are a function of the depth of the overburden, as well as with the amount of trapped gas present. Nonetheless, the hydrocarbon content of the reservoir will be held in the pores of the earthen material until released and passed to the surface.

Operationally, the hydrocarbons will be urged by underground pressure, toward a perforated well casing in the overburden which represents a low pressure area. From there, the hydrocarbon is urged to the well head and produced in the normal manner.

The hydrocarbon outflow will normally comprise liquid crude oil together with gas, or even gas alone. As a matter of practicality, the two components are separated at the surface. The gas can be either retained for use, or disposed of by flaring. The liquid however, together with any solid materials which it may be carrying is further processed.

Certain forms of substrate will be more amenable to erosion by movement of the hydrocarbon element therethrough than will other types of substrate. In the instance of a primarily sandy environment which embodies largely unconsolidated sand, the latter will be readily carried along in the fluid flow.

The capability for solid particles being carried along with the passing hydrocarbon or gas flow is dependent to a large measure on a number of factors. It relies for example on gas pressure, velocity of the hydrocarbon or gas at its entry into the well, and also on the size distribution of the solid particles in the formation.

Some of the particles are sufficiently small to be carried to the well head and will thereafter be separated from the hydrocarbon stream. This is generally done by a settling system, by gravity, or by similar means. Other sand particles which are too large to be transported by the hydrocarbon stream will remain underground.

In some instances, flow of the sand laden hydrocarbon will result in sand particles being deposited along the normal path of the fluid. For example, the particles can be caught and retained within the many passages, joints and connections encountered between the well casing lower end and the well head.

To obviate this impeding or clogging of a well's passages, means is often provided to physically block movement of the solids. This however must be achieved while permitting only the liquid to pass through. One such means includes the usual well gravel pack, or even filters of various sizes and structure which are positioned within the wall whereby to enhance a continuous filtering operation.

Various forms of sand filters are known in the prior art and have been utilized with a degree of success depending on the conditions of the environment from which the hydrocarbon fluid is extracted.

Toward overcoming or at least alleviating the problem of sand accumulation within a subterranean well, there is presently provided a durable filtering means. The latter is comprised primarily of an elongated casing including an outer member, whose walls are perforated to permit the inward passage of a fluid such as a crude oil or a gas.

The inwardly moving fluid is directed through a filter bed comprised of a metallic mass which defines a multitudinous number of passages therethrough. The metallic mass in one embodiment comprises a generally annular configuration formed of a compressed wool-like media which is retained in a desired shape and density by a surrounding sheath. The filter bed is positioned within an annular filter chamber which extends substantially longitudinally of the filter body.

It is therefore an object of the invention to provide a filter which is capable of segregating out the solid component of a fluid flow. A further object is to provide a filter of the type contemplated wherein a bed comprised of randomly disposed fibrous members defines a plurality of passages which are capable of retaining solid particles therein and for passing the particle-free fluid therethrough. A still further object of the invention is to provide a filter element which is capable of functioning in an elevated temperature environment by separating particulate matter from a fluidic medium. Usually said matter is carried in such manner as to permit it to be physically retained and accumulated.

DESCRIPTION OF THE DRAWINGS

Referring to the drawings, FIG. 1 illustrates a hydrocarbon producing well 10 disposed in a generally vertical disposition and extending into a substrate 11. Normally the well tubing or casing 12 which makes up the pipe string is perforated by a series of holes 13 at those vertical levels where it is determined that hydrocarbon such as crude oil or gas is present.

Figure 1:
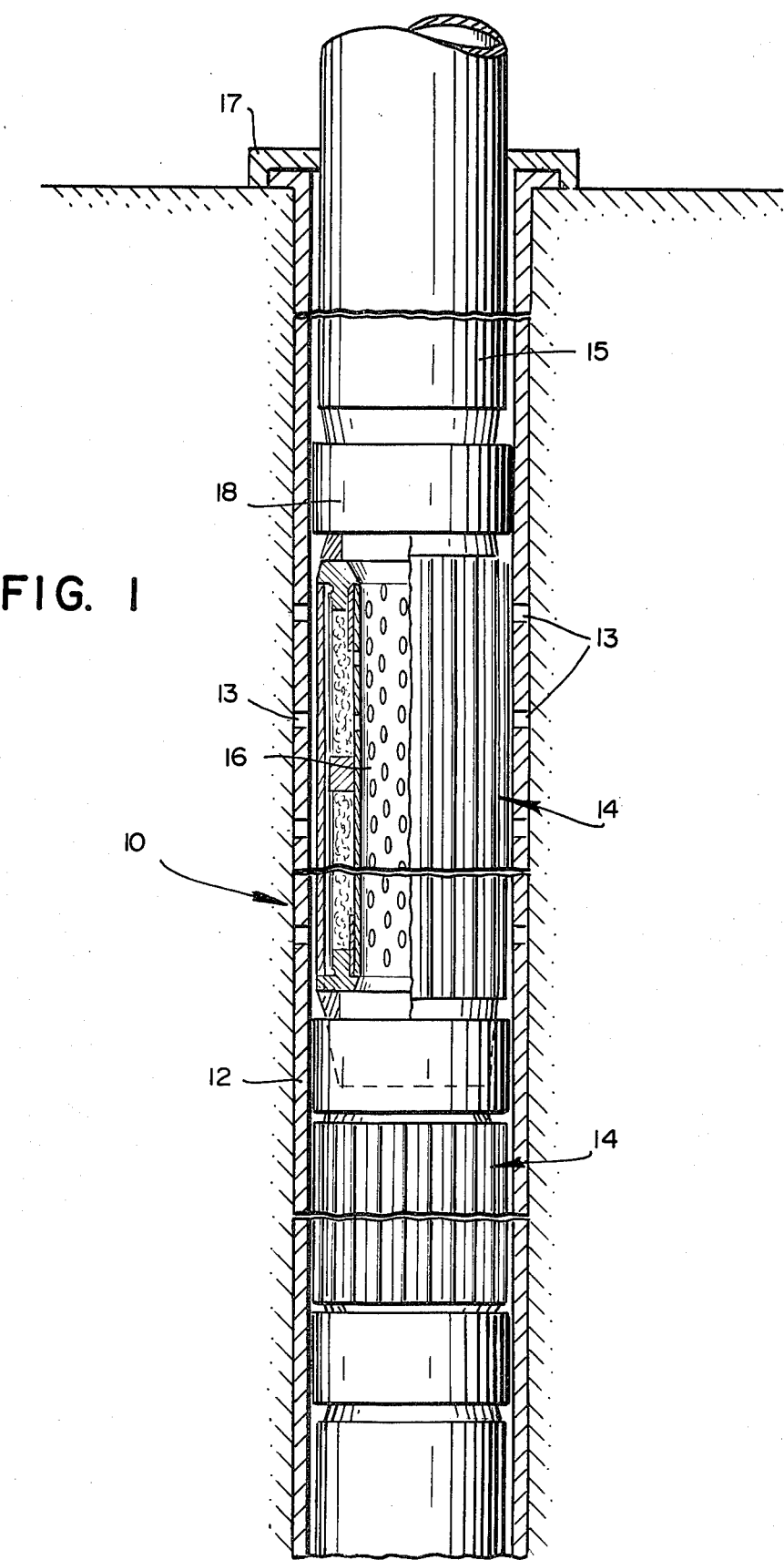
FIG. 1 illustrates a vertical elevation view in cross-section of a well embodying the instant filter.

A filter element or elements 14 are disposed within well tubing 12 preferably at discrete sections of the substrate. They are located particularly at levels where inflowing streams of hydrocarbon carry an amount of solid particulate matter such as sand particles into the casing's central passage 16. The hydrocarbon flow, with the solids removed, will then be urged upwardly by formation pressure to the well head 17 where it is produced, to be further treated by a suitable separation process.

In many applications the well tubing 12 may not be present in the well, in which instance the filter element or elements 14 are disposed in the well in direct contact with the substrate 11.

Filter element 14 hereinafter described in detail, is included in pipe string 15. The latter is normally comprised of discrete lengths of pipe or casing 12 which are connected together at their respective ends. In the present arrangement, filter 14 is connected at its respective upper and lower ends to adjacent pipe sections. A pair of terminally positioned collars 18 and 19 threadably engage and communicate filter 14 with the respective pipe lengths.

Figure 2:
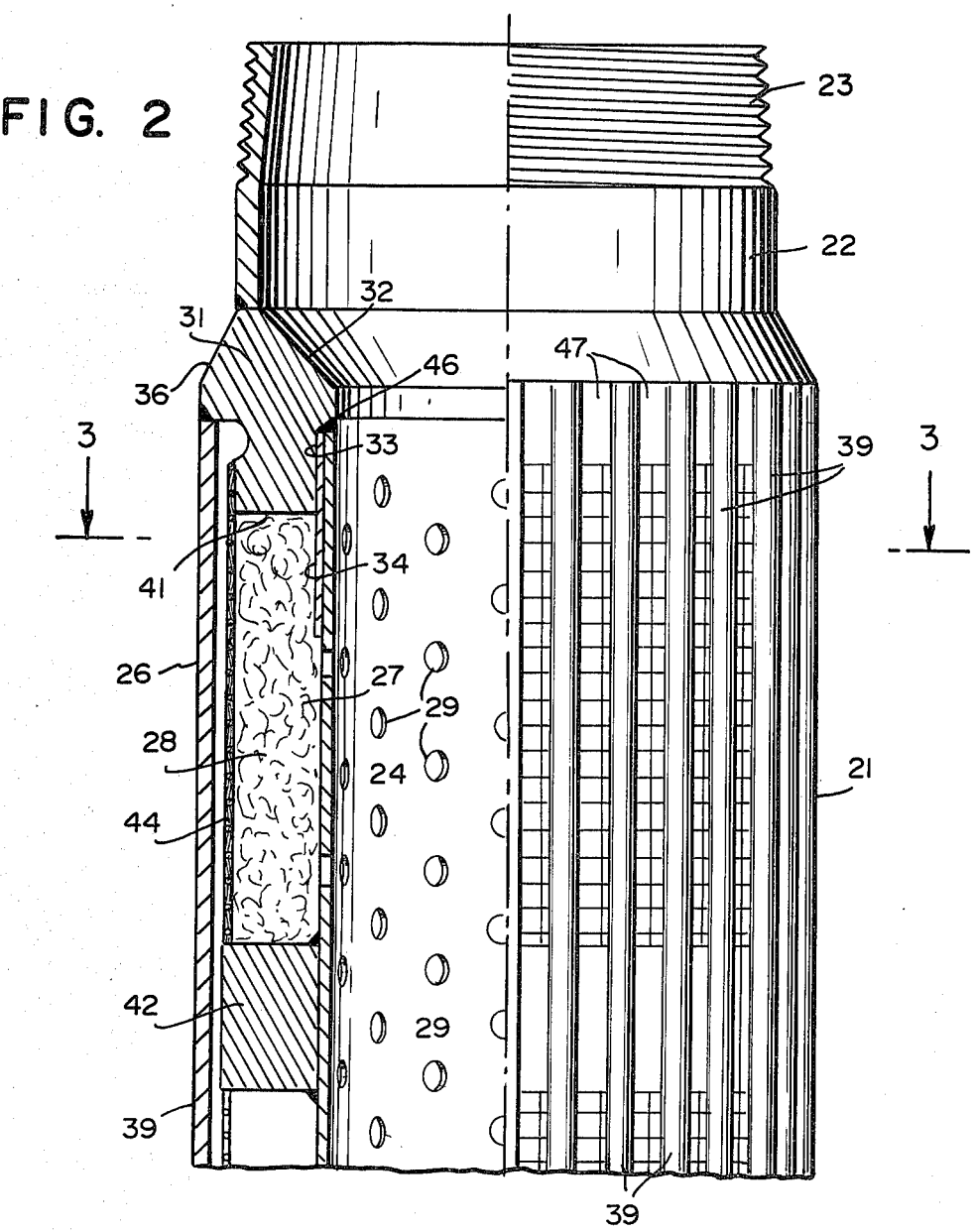
FIG. 2 is an enlarged view in partial cross-section of the filter.
Figure 3:
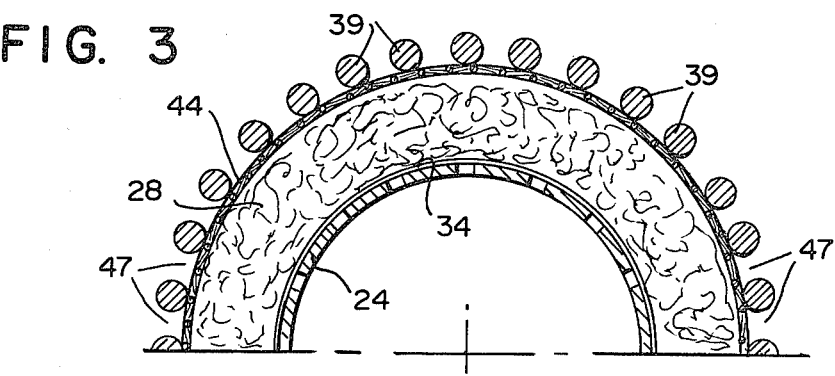
FIG. 3 is a segment of the filter taken along section line 3—3 in FIG. 2.

Referring to FIG. 2, in a preferred embodiment, filter 14 comprises an elongated composite casing 21 which can be of any desired length required for a particular application. Each end of the casing 21 is provided with a connector section 22 having a threaded segment 23. The latter is adapted to threadably engage a connecting collar 18 or the like.

Casing 21 is comprised of an inner perforate member 24 which is disposed substantially concentrically with an outer member 26. Both said members are capable of readily passing a flow of the hydrocarbon liquid laterally therethrough. Between the respective inner and outer casing members an annular chamber 27 is defined. Said chamber is capable of positioning a composite filter bed assembly 28 through which the hydrocarbon fluid passes.

Inner casing member 24 as shown, is comprised of an elongated metallic pipe or tubing section having a series of openings or ports 29 formed in the walls thereof. Said openings can be in a pattern of merely indiscriminately disposed. As here shown, openings 29 can be circular in form; they can, however, assume any desired configuration such as elongated slots running either peripherally of, or longitudinally along the filter 14.

Inner casing member 24, together with the outer casing segment 26 are sufficiently strong and capable to function as an intergral part of pipe string 15. In such a function the filter will be designed to accommodate stresses as determined by the conditions of its use.

In the shown arrangement perforated steel pipe 24 can assume the standard wall thickness of normal drill pipe. Said thickness will depend to some degree on the supporting capability of the outer casing segment 26.

Each end of inner casing 24 is engaged with a fitting 31. Said engagement can be by means of a welded, or a disconnectable joint. Fitting 31 is comprised of an annular or ring-like member having a tapered inner lip 32 which terminates at one end along a peripheral wall 33. The latter is adapted to receive a thin sealing ring 34 which is welded thereto and which extends for several inches contiguous with the inner casing member 24. Said ring functions to avoid or minimize leakage of said particles past the connection between fitting 31 and inner member 24.

One end of inner casing 24 is likewise fastened, preferably at a peripheral welded joint 46, to wall 33 of closure panel 31.

The exterior surface of fitting 31 is comprised of a second tapered surface 36 which terminates at an inset cylindrical rim 37. The latter is set sufficiently set back to receive the end of outer casing member 26 and to concurrently position the sheath member 38 which will be hereinafter noted in greater detail.

Outer casing member 24 as shown, is comprised in one embodiment of a plurality of discrete, spaced apart, elongated strips or bars 39. Each strip end is received in the recessed rim 37 of the end fitting 31. Strips 39 are preferably welded into position about rim 37 and extend longitudinally of the filter 14 thereby defining a plurality of longitudinal slots 47 therebetween.

A primary function of outer casing segment 26 is to assure the structural integrity of the filter, whose outer wall will normally engage a wall of a well casing or a well bore. It will further resist the abrasive action which would be encountered when pipe string 15 is slid along a well casing or well bore. Strips 39 can assume the form of circular steel rods, or rectangular members. Either configuration is adequate to serve the purpose as an integral segment of the filter structure.

The respective inner and outer casing members are preferably coaxial, and spaced sufficiently apart so that the annular chamber 27 defined between their adjacent wall forms is substantially uniform. Said chamber 27 is closed at one end by the terminal wall 41 of the fitting 31. The other end is closed by a ring-like support and spacer element 42. The latter is fixed to the surface of inner casing member 24 and in abutting contact with outer casing members 26 to lend radial strength to the filter.

While the outer casing member 26 is herein illustrated as comprising individual strips, such function can be achieved by an alternate embodiment such as by a single elongated, perforated length of tubing or pipe. The latter would be positioned in a similar manner as are strips 39, to fitting 31. The perforations in said pipe would of necessity be of sufficient size to readily pass a flow of sand particle carrying fluid inwardly through the pipe member and into the enclosed filter bed 28.

Filter bed 28 is defined in one embodiment by a series of annular, longitudionally positioned units, each of which is carried in a separate filter chamber 27. Each bed 28 is comprised of a mass of randomly disposed metallic fibers that form a multitudinous number of tortuous passages therethrough.

An example of such a mass having filtering capabilities would be a metallic wool or the like which is compressed to a predetermined density within filter chamber 27.

The environmental temperature endemic to the well depth through which the hydrocarbon fluid is being extracted, can be several hundred degrees. Further, well production is often enhanced by a hot fluid injection, a factor that can produce an even higher subterranean temperature.

The metallic fibers making up filter bed 28, must therefore be resistant to thermal deformation over a period of time under such conditions. Further, the environment established within bed 28 by hot or heated flowing fluid can be of a corrosive nature. Thus, preferably the fibrous material filter media is formed of a non-corrosive, or corrosion resistant metallic material.

An example of the type of material of which filter bed 28 is comprised, can be of a wool-like structure formed of steel fibers, stainless steel fibers, brass fibers or the like. The fibers, although randomly disposed, are sufficiently compressed to define an open passage area therebetween suitable for retaining or blocking passage of sand particles of a particular magnitude. Further, the filter passages in bed 28 will allow flow of the particle-free hydrocarbon fluid into central passage 16.

The periphery of filter bed 28 is surrounded by a sheath-like member 44 which tightly encloses the bed after the latter has been compressed to its desired density. Sheath 44 is preferably comprised of a metallic woven cloth formed of steel, stainless steel, or a similar metal. The cloth is capable of resisting the above noted elevated temperature, and often harmful environment of the undergound substrate.

The desired sand filtering function of composite bed 28 is achieved as a result of the coordinated action of the multi-passage wool-like portion of the bed together with the particle retention action of the external sheath member 44. It is appreciated that the multi-passage segment of the bed will resist the passage of, and retain at least a portion of the sand content of a fluid stream. Under such circumstances, an ordinary filter could become clogged after only a limited period of usage.

However, to promote the accumulation of larger sand particles prior to entry thereof into bed 28, sheath 44 is preferably formed as noted of a pliable, metallic cloth which fits closely about the periphery of bed 43. The cloth is characterized by a gauge size within the range of about 4 mm to 0.5 mm, a range that will be determined by the size of the larger particles which are to be retained.

Figure 4:
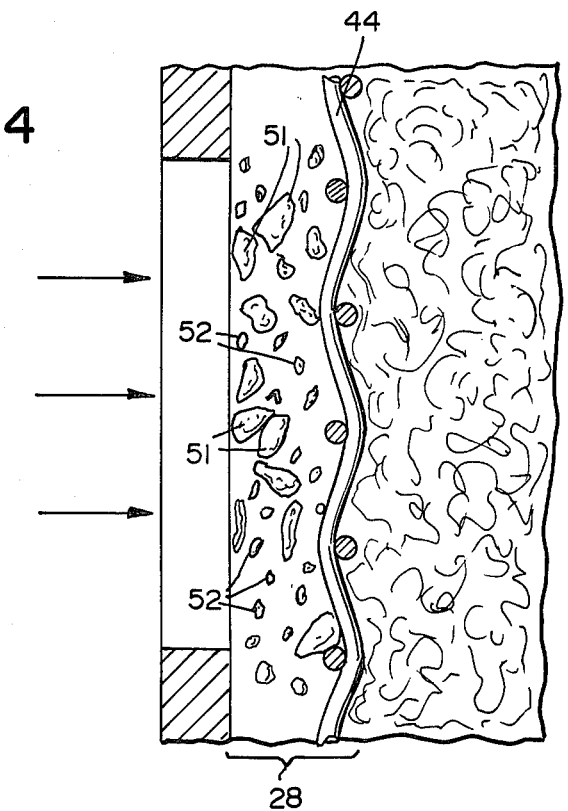
FIGS. 4 and 5 represent graphically on a greatly enlarged scale, a flow of particle carrying fluid.
Figure 5:
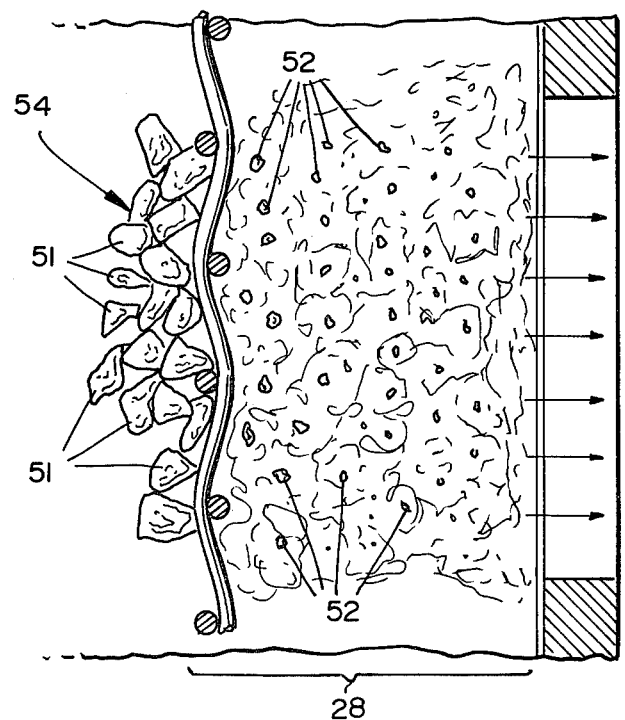

Referring to FIGS. 4 and 5, sand particle laden streams, carrying a variety of sand particle sizes, 51 and 52 (indicated by the directional arrow) pass from the substrate 11 through openings 41 in outer member 26. The stream then comes into contact with the screening of sheath 44. Over an operating span of time, the larger sand particles 51 will tend to bunch up and accumulate in the sheath 44 open areas. Eventually, and as shown in FIG. 5, these larger particles 51 when forced into contact with each other, and with the woven cloth fibers, will bridge across this open area thereby defining a relatively rigid, fluid pervious barrier 54.

Bridge 54 will define a barrier having interstices therein which are capable of passing only smaller particles such as 52 than those from which the bridge 54 are formed. Continued flow of the particle laden fluid will progressively build and expand the rigid bridge 54 outwardly toward the casing which traverses external member 26.

The size range of the particles retained by the filter or allowed to pass through can be controlled by a changing of the density of the metallic wool media and the size of the openings in the woven steel cloth.

The residual flow of production fluid, now carrying only finer particles 52, will enter the myriad passages of the filter media portion of bed 28. In the latter which has been compressed to a desired density, the finer particles 52 will be retained from the fluid flow.

At the inner or downstream side of filter bed 28, only the minutest particles will be carried by the fluid flow into central passage 16. This flow is now produced and subjected to a settling or similar action whereby the remaining particles can be readily separated out.

It is appreciated that by adjusting the gauge of the woven cloth in sheath 44, as well as the density of the compressed metallic wool in 28, the filter bed can be designed to best accommodate the produced fluid at a particular site. More specifically by conforming the openings of sheath 44 with the density of the metallic wool, an optimum filtering operation is achieved with maximum fluid production.

We claim:

1. A heat resisting filter element for treating a particulate carrying, multi-phase fluid which has been extracted from a subterranean reservoir and which embodies a hot fluid stream into which solid particles of varying sizes from said subterranean reservoir are intermixed, whereby to separate the particulate matter from the hot fluid stream, which filter element includes;
   a casing comprising at least two concentrically disposed elongated perforate members which define an annular chamber intermediate adjacent walls thereof, and a central axial flow passage therethrough,
   a panel engaging the adjacently disposed common ends of the respective perforate members to define opposed terminal closures to the annular chamber,
   port means formed in each respective closure panel being communicated with the said central axial flow passage,
   a composite filter bed within said annular chamber and comprised of; a first filter bed section which substantially occupies said annular chamber and is comprised of a mass of randomly disposed fibers which are resistant to thermal deformation, which fibers are sufficiently compressed into said mass to define multitudinous tortuous passages therethrough, and
   a second filter bed section comprising a perforate sheath formed of a non-corrosive metal and defining openings therein of a sufficient size to prevent flow of the larger of said solid particles, while allowing the flow of smaller solid particles together with hot fluid into said central axial passage.

2. In an apparatus as defined in claim 1, wherein the fibrous mass of said filter bed is formed of metallic fibrils.

3. In an apparatus as defined in claim 1, wherein the fibrous mass of said filter bed is formed of steel fibrils.

4. In an apparatus as defined in claim 1, where the fibrous mass of said filter bed is formed of stainless steel fibrils.

5. In an apparatus as defined in claim 1, wherein the perforate sheath is formed of steel fibers.

6. In an apparatus as defined in claim 1, wherein the perforate sheath is formed of stainless steel wire.

7. In an apparatus as defined in claim 1, wherein the perforate sheath comprises a woven metallic cloth having a gauge within the range of 4 mm to 0.5 mm.

8. In the apparatus as defined in claim 1, wherein said outer casing includes; a plurality of spaced apart rods which extend longitudinally of the filter element.

* * * * *